(12) United States Patent
Tsuchizawa et al.

(10) Patent No.: US 11,807,337 B2
(45) Date of Patent: Nov. 7, 2023

(54) BICYCLE CONTROLLER AND BICYCLE CONTROL SYSTEM INCLUDING BICYCLE CONTROLLER

(71) Applicant: Shimano Inc., Osaka (JP)

(72) Inventors: Yasuhiro Tsuchizawa, Osaka (JP); Hiroshi Matsuda, Osaka (JP); Takuya Katsuki, Osaka (JP)

(73) Assignee: Shimano Inc., Osaka (JP)

( * ) Notice: Subject to any disclaimer, the term of this patent is extended or adjusted under 35 U.S.C. 154(b) by 40 days.

(21) Appl. No.: 17/344,200

(22) Filed: Jun. 10, 2021

(65) Prior Publication Data
US 2021/0300499 A1 Sep. 30, 2021

Related U.S. Application Data

(62) Division of application No. 15/874,670, filed on Jan. 18, 2018, now Pat. No. 11,059,537.

(30) Foreign Application Priority Data

Jan. 31, 2017 (JP) .................................. 2017-015273

(51) Int. Cl.
*B62J 99/00* (2020.01)
*B62M 9/12* (2006.01)
(Continued)

(52) U.S. Cl.
CPC ................ *B62M 6/50* (2013.01); *B62J 43/13* (2020.02); *B62M 6/45* (2013.01); *B62M 9/12* (2013.01);
(Continued)

(58) Field of Classification Search
CPC . B62J 45/20; B62J 43/13; B62M 6/00; B62M 6/40; B62M 6/45; B62M 6/50;
(Continued)

(56) References Cited

U.S. PATENT DOCUMENTS 10,919,601 B2   2/2021  Baumgaertner et al.
2004/0206188 A1* 10/2004  Takamoto ............... B62M 25/08
                                                        73/781

(Continued)

FOREIGN PATENT DOCUMENTS

DE    10 2016 000 196 A1   7/2016
JP         2016-132258 A   7/2016

*Primary Examiner* — Russell Frejd
*Assistant Examiner* — Sara J Lewandroski
(74) *Attorney, Agent, or Firm* — Global IP Counselors, LLP

(57) ABSTRACT

A bicycle control device includes an electronic controller that controls a motor to assist propulsion of a bicycle. The electronic controller is configured to decrease an output of the motor upon determining that a shifting device is performing a shifting action to change a transmission ratio of the bicycle. The electronic controller is further configured to end the control that decreases the output of the motor before a predetermined period elapses upon determining that the shifting action is completed or the transmission ratio is changed before the predetermined period has elapsed. The electronic controller is further configured to end the control that decreases the output of the motor upon determining that the predetermined period has elapsed in a case where the shifting action or the change in the transmission ratio is uncompleted even though the predetermined period has elapsed.

8 Claims, 5 Drawing Sheets

(51) Int. Cl.
  *B62M 6/50* (2010.01)
  *B62J 43/13* (2020.01)
  *B62M 6/45* (2010.01)
  *B62M 15/00* (2006.01)
  *B62M 25/08* (2006.01)
  *B62J 45/20* (2020.01)

(52) U.S. Cl.
  CPC ............ *B62M 15/00* (2013.01); *B62M 25/08* (2013.01); *B62J 45/20* (2020.02)

(58) Field of Classification Search
  CPC ........ B62M 6/55; B62M 11/04; B62M 13/02; B62M 15/00; B62M 2025/006
  See application file for complete search history.

(56) References Cited

U.S. PATENT DOCUMENTS

| | | |
|---|---|---|
| 2011/0303474 A1 | 12/2011 | Kimmich et al. |
| 2013/0054065 A1 | 2/2013 | Komatsu |
| 2013/0054066 A1* | 2/2013 | Watarai ................... B60L 50/20 701/22 |
| 2013/0267376 A1 | 10/2013 | Takachi |
| 2014/0166385 A1 | 6/2014 | Arimune et al. |
| 2014/0235383 A1 | 8/2014 | Wesling |
| 2016/0096589 A1* | 4/2016 | Sato ....................... B62M 9/122 474/70 |
| 2016/0207588 A1 | 7/2016 | Tsuchizawa |
| 2017/0349236 A1 | 12/2017 | Baumgaertner et al. |
| 2018/0029668 A1 | 2/2018 | Miglioranza |
| 2018/0118211 A1 | 5/2018 | Tsuchizawa et al. |

\* cited by examiner

BICYCLE CONTROLLER AND BICYCLE CONTROL SYSTEM INCLUDING BICYCLE CONTROLLER

CROSS-REFERENCE TO RELATED APPLICATIONS

This application is a divisional application of U.S. patent application Ser. No. 15/874,670, filed on Jan. 18, 2018. This application claims priority to Japanese Patent Application No. 2017-015273, filed on Jan. 31, 2017. The entire disclosures of U.S. patent application Ser. No. 15/874,670 and Japanese Patent Application No. 2017-015273 are hereby incorporated herein by reference.

BACKGROUND

Technical Field

The present disclosure generally relates to a bicycle control device and a method for controlling a bicycle.

Background Information

Some bicycles are provided with a bicycle controller to control shifting of a transmission. For example, Japanese Patent No. 5,496,158 discloses a bicycle control device that decreases output of a motor, which assists propulsion of a bicycle, in a case where a shifting device is actuated to change the transmission ratio of the bicycle.

SUMMARY

One object of the present invention is to provide a bicycle control device and a method for controlling a bicycle that appropriately decrease output of a motor in a case where a shifting device is actuated.

In accordance with a first aspect of the present disclosure, a bicycle control device includes an electronic controller configured to control a motor, which assists propulsion of a bicycle. The electronic controller is further configured to decrease output of the motor upon determining a shifting device performs a shifting action to change a transmission ratio of the bicycle. The electronic controller is further configured to end the control that decreases the output of the motor before the predetermined period elapses. In a case where the shifting action or the change in the transmission ratio is uncompleted even though the predetermined period has elapsed, the electronic controller ends the control that decreases the output of the motor upon determining that the predetermined period has elapsed. With the bicycle control device according to the first aspect, in a case where the shifting device is actuated, the output of the motor is appropriately decreased as compared to a case where the output of the motor is always decreased at the end of the predetermined period.

In accordance with a second aspect of the present disclosure, the bicycle control device according to the first aspect is configured so that the predetermined period is set individually according to the transmission ratio that is to be changed. With the bicycle control device according to the second aspect, the output of the motor is decreased for an appropriate time corresponding to the transmission ratio.

In accordance with a third aspect of the present disclosure, the bicycle control device according to the first aspect or the second aspect is configured so that the electronic controller is further configured to determine whether or not the transmission ratio has been changed based on a rotational speed of a crank of the bicycle and a rotational speed of a wheel of the bicycle. With the bicycle control device according to the third aspect, whether or not the transmission ratio has been changed is appropriately determined based on the rotational speed of the crank of the bicycle.

In accordance with a fourth aspect of the present disclosure, the bicycle control device according to the third aspect is configured so that the electronic controller is further configured to perform control in accordance with the determination based on the rotational speed of the crank of the bicycle only upon determining that a manual driving force inputted to the crank is greater than or equal to a predetermined value. With the bicycle control device according to the fourth aspect, the control is executed in accordance with the determination based on the rotational speed of the crank of the bicycle only in a case where a determination of the transmission ratio based on the rotational speed of the crank tends to be accurate.

In accordance with a fifth aspect of the present disclosure, the bicycle control device according to any one of the first to fourth aspects is configured so that the electronic controller is further configured to control an electric actuator that actuates the shifting device so that the shifting device performs the shifting action. With the bicycle control device according to the fifth aspect, the electric actuator is controlled to actuate the shifting device.

In accordance with a sixth aspect of the present disclosure, the bicycle control device according to the fifth aspect is configured so that the electronic controller is further configured to actuate the shifting device in a case where a rotational angle of a crank of the bicycle is in a predetermined range. The predetermined range includes a top dead center of the crank of the bicycle or a bottom dead center of the crank of the bicycle. With the bicycle control device according to the sixth aspect, the shifting device is actuated in a range that includes the top dead center or bottom dead center of the crank where manual driving force is small.

In accordance with a seventh aspect of the present disclosure, a method for controlling a bicycle to control a motor that assists propulsion of the bicycle includes decreasing an output of the motor in a case where a shifting device performs a shifting action to change a transmission ratio of the bicycle, terminating the control that decreases the output of the motor before a predetermined period ends upon determining the shifting action is completed or the transmission ratio is changed before the predetermined period elapses, and terminating the control that decreases the output of the motor upon determining the predetermined period has elapsed in a case where the shifting action or the change in the transmission ratio is uncompleted even though the predetermined period has elapsed. With the method for controlling a bicycle according to the seventh aspect, in a case where the shifting device is actuated, the output of the motor is appropriately decreased as compared to a case where the output of the motor is always decreased at the end of the predetermined period.

The bicycle control device and the method for controlling a bicycle according to the present invention appropriately decrease output of the motor in a case where the shifting device is actuated.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
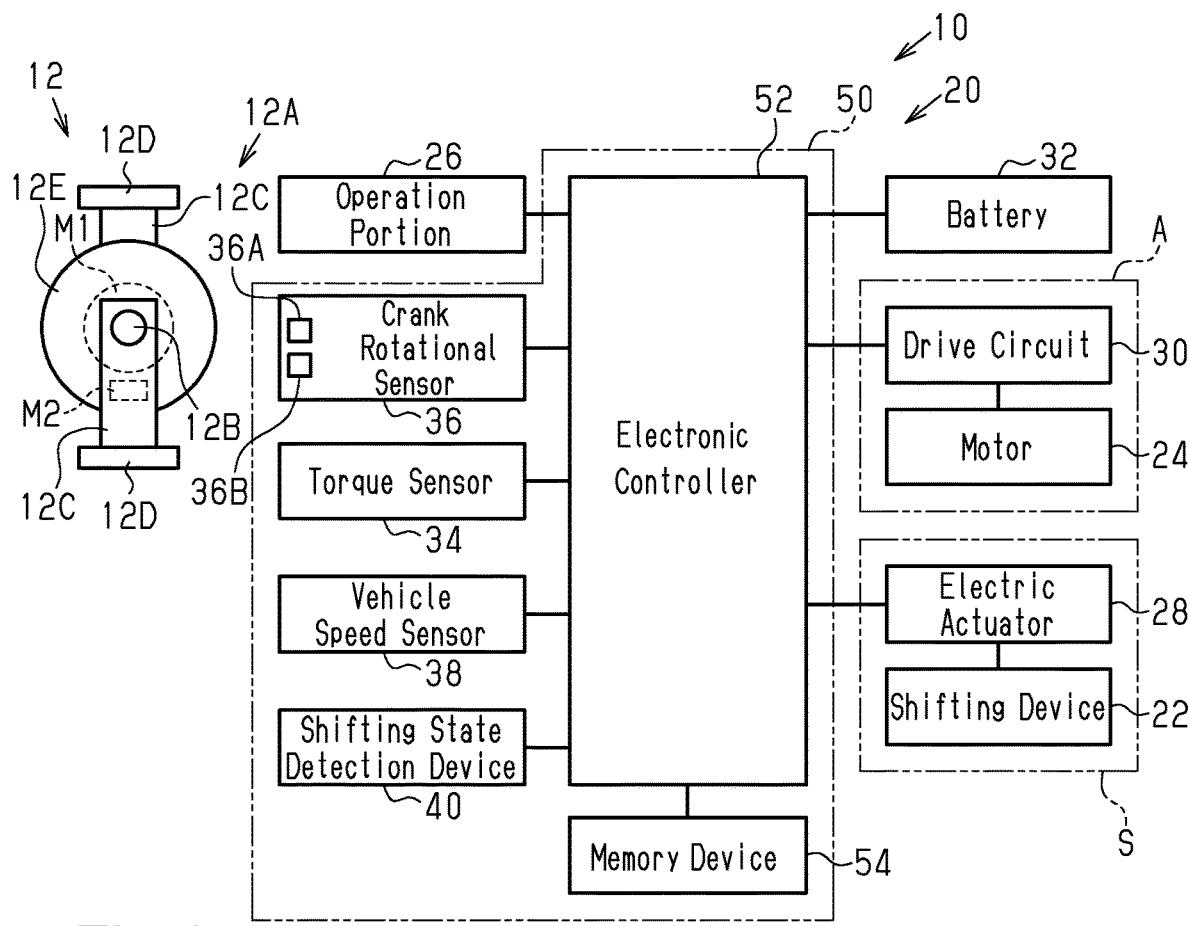
FIG. 1 is a block diagram in accordance with an electrical configuration of a bicycle that includes a bicycle control device in accordance with a first embodiment.

A bicycle that includes a first embodiment of a bicycle control device and a bicycle control system will now be described with reference to FIG. 1. A bicycle 10 includes a drive mechanism 12 and a bicycle control system 20. The drive mechanism 12 includes a crank 12A and pedals 12D. The crank 12A includes a crankshaft 12B and crank arms 12C. The drive mechanism 12 transmits a manual driving force, which is applied to the pedals 12D, to a rear wheel (not shown). The drive mechanism 12 is configured to transmit rotation of the crank 12A to the rear wheel, for example, via a chain, a belt, or a shaft (not shown). The drive mechanism 12 includes a front rotary body 12E, which is coupled to the crankshaft 12B by a one-way clutch (not shown). The one-way clutch is configured to allow for forward rotation of the front rotary body 12E in a case where the crank 12A rotates forward and prohibit rearward rotation of the front rotary body 12E in a case where the crank 12A is rotated rearward. The front rotary body 12E includes a sprocket, a pulley, or a bevel gear (not shown). The front rotary body 12E can be coupled to the crankshaft 12B without the one-way clutch.

The bicycle control system 20 includes a bicycle control device 50, the shifting device 22 and the motor 24. In one example, the bicycle control system 20 further includes an operation portion 26, an electric actuator 28, a drive circuit 30 of the motor 24, a battery 32, a torque sensor 34, a crank rotation sensor 36, a vehicle speed sensor 38 and a shifting state detection device 40.

The shifting device 22 and the electric actuator 28 form a shifting apparatus S. The shifting device 22 changes a transmission ratio r of the bicycle 10. The electric actuator 28 actuates the shifting device 22 so that the shifting device 22 performs a shifting action. The shifting device 22 can change the transmission ratio r of the bicycle 10 in a stepped manner. In one example, the shifting device 22 changes the speed of rotation that is input to the crankshaft 12B and transmits the rotation to the rear wheel. In this case, the shifting device 22 includes an internal geared hub. The internal geared hub is provided around the crankshaft 12B or on a hub provided on an axle of the rear wheel. The internal geared hub can be provided in a force transmission path extending between the crank 12A and the front rotary body 12E. In another example, the shifting device 22 changes the speed of rotation that is input to the crankshaft 12B and transmits the rotation to the rear wheel by changing a chain between a plurality of front sprockets or a plurality of rear sprockets. In this case, the shifting device 22 includes an external shifting device (derailleur). The external shifting device includes at least one of a front external shifting device, which changes the chain between a plurality of front sprockets (not shown), and a rear external shifting device, which changes the chain between a plurality of rear sprockets (not shown). The electric actuator 28 includes an electric motor. The shifting device 22 performs the shifting action to change the transmission ratio r of the bicycle 10 in a stepped manner in accordance with the driving of the electric actuator 28. In a case where the shifting device 22 is an internal shifting device, the shifting action includes an action that changes the coupling state of gears included in a planetary gear mechanism located in the shifting device 22. In a case where the shifting device 22 is an external shifting device, the shifting action includes an action that changes the chain between the sprockets. The internal shifting device can include a continuously variable transmission (CVT) mechanism. In one example, the CVT mechanism includes a planetary mechanism that includes an input body, an output body, and a transmission body. Rotation of the transmission body continuously changes the transmission ratio r. The shifting apparatus S can include components other than the shifting device 22 and the electric actuator 28.

The motor 24 and the drive circuit 30 form an assist device A. The drive circuit 30 controls electric power that is supplied from the battery 32 to the motor 24. The motor 24 assists propulsion of the bicycle 10. The motor 24 includes an electric motor. The motor 24 is provided to transmit rotation to a manual driving force transmission path extending from the pedals 12D to the rear wheel. Alternatively, the motor 24 is provided to transmit rotation to a front wheel (not shown). The motor 24 is provided on a frame (not shown) of the bicycle 10, the rear wheel, or the front wheel. In one example, the motor 24 is coupled to a driving force transmission path that extends from the crankshaft 12B to the front rotary body 12E. It is preferred that a one-way clutch be provided in a driving force transmission path that extends between the motor 24 and the crankshaft 12B so that the motor 24 will not be rotated by rotation force of the crank in a case where the crankshaft 12B is rotated in a direction in which the bicycle 10 moves forward. The assist device A can include components other than the motor 24 and the drive circuit 30. The assist device A can include, for example, a reduction gear that reduces the speed of rotation of the motor 24 and outputs the rotation.

The operation portion 26 can be operated by the rider. The operation portion 26 is coupled to a handlebar (not shown) of the bicycle 10. The operation portion 26 is communicable with an electronic controller 52 of the bicycle control device 50. The operation portion 26 is connected to the electronic controller 52 to perform wired or wireless communication with the electronic controller 52. The operation portion 26 is communicable with the electronic controller 52, for example, through power line communication (PLC). The operation portion 26 transmits an output signal to the electronic controller 52 in accordance with an operation performed by the rider on the operation portion 26. The output signal includes a signal for changing the shift stage. The output signal includes a shift-up signal, which increases the transmission ratio r of the bicycle 10, or a shift-down signal, which decreases the transmission ratio r of the bicycle 10. The operation portion 26 includes, for example, an operation member, a sensor that detects movement of the operation member, and an electric circuit that performs communication with the electronic controller 52 in accordance with an output signal of the sensor (not shown).

The battery 32 includes one or more battery cells. The battery cell includes a rechargeable battery. The battery 32 is mounted on the bicycle 10 to supply electric power to other electric components that are electrically connected to the battery 32 by wires (e.g., motor 24, electric actuator 28, and bicycle control device 50).

The torque sensor 34 outputs a signal corresponding to manual driving force TA. The torque sensor 34 detects manual driving force TA that is applied to the crankshaft 12B. The torque sensor 34 can be provided between the crankshaft 12B and the front rotary body 12E. Alternatively, the torque sensor 34 can be provided on one of the crankshaft 12B, the front rotary body 12E, the crank arms 12C, and the pedals 12D. The torque sensor 34 can be realized, for example, by a strain sensor, a magnetostriction sensor, an optical sensor, or a pressure sensor. Any sensor can be used as long as the sensor outputs a signal corresponding to the manual driving force TA, which is applied to the crank arms 12C or the pedals 12D.

The crank rotation sensor 36 detects a rotational angle CA of the crank. The crank rotation sensor 36 is coupled to the frame (not shown) of the bicycle 10 or a housing (not shown) of the assist device A. The crank rotation sensor 36 includes a first element 36A, which detects the magnetic field of a first magnet M1, and a second element 36B, which outputs a signal corresponding to the positional relationship with a second magnet M2. The first magnet M1 is provided on one of the crankshaft 12B and the crank arms 12C coaxially with the crankshaft 12B. The first magnet M1 is an annular magnet and has a plurality of magnetic poles alternately located next to one another in a circumferential direction. The first element 36A detects the rotational angle of the crank 12A relative to the frame. In a case where the crank 12A rotates once, the first element 36A outputs a signal, one cycle of which corresponds to the angle obtained by dividing 360 degrees by the number of the same magnetic poles. The minimum value of the rotational angle of the crank 12A that is detectable by the crank rotation sensor 36 is less than or equal to 180 degrees. The minimum value is, preferably, 15 degrees and, more preferably, 6 degrees. The second magnet M2 is provided on one of the crankshaft 12B and the crank arms 12C. The second element 36B detects a reference angle of the crank 12A with respect to the frame (e.g., top dead center or bottom dead center of crank 12A). The second element 36B outputs a signal, one cycle of which corresponds to one rotation of the crankshaft 12B.

Instead of the first element 36A and the second element 36B, the crank rotation sensor 36 can include a magnetic sensor that outputs a signal corresponding to the strength of the magnetic field. In this case, instead of the first magnet M1 and the second magnet M2, an annular magnet having the magnetic field that changes in strength in the circumferential direction is coaxially provided on the crankshaft 12B. If a magnetic sensor that outputs a signal corresponding to the strength of the magnetic field is used, a rotational speed N of the crank and the rotational angle of the crank 12A can be detected by a single sensor. This simplifies the structure and facilitates the assembling. The crank rotation sensor 36 can detect the rotational speed N of the crank in addition to the rotational angle CA of the crank. The rotational speed N of the crank can be detected using any one of the output of the first element 36A, the output of the second element 36B, and the output of the magnetic sensor.

The vehicle speed sensor 38 detects a rotational speed V of a wheel. The vehicle speed sensor 38 is electrically connected to the electronic controller 52 by a wire or without wires. The vehicle speed sensor 38 is coupled to a chainstay (not shown) of the frame. The vehicle speed sensor 38 transmits a signal to the electronic controller 52 in correspondence with a change in the relative position between a magnet (not shown) attached to the rear wheel and the vehicle speed sensor 38. It is preferred that the vehicle speed sensor 38 include a magnetic reed, which forms a reed switch, or a Hall element.

The shifting state detection device 40 detects the actuation state of the shifting device 22. In one example, the shifting state detection device 40 detects the position of a moving portion (not shown) of the shifting device 22 that moves in accordance with a change in the transmission ratio r or the position of an actuation portion (not shown) of the electric actuator 28. The electric actuator 28 can include a reduction gear. The actuation portion, which is detected by the shifting state detection device 40, can be included in the reduction gear.

The bicycle control device 50 includes the electronic controller 52. In one example, it is preferred that the bicycle control device 50 further include a memory device 54. The electronic control unit 12 can also include general circuits such as an input interface circuit and an output interface circuit. The electronic controller 52 includes an arithmetic processing device that executes predetermined control programs. The arithmetic processing device includes, for example, a central processing unit (CPU) or a micro processing unit (MPU). The electronic controller 52 can include one or more microcomputers. The electronic controller 52 further includes a timer. The memory device 54 stores information used in various kinds of control programs and various kinds of control processes. The memory device 54 includes, for example, any a non-transitory computer readable medium such as a nonvolatile memory device and a volatile memory device. The memory device 54 is one or more computer storage devices (i.e., one or more computer memory devices) such as a random access memory (RAM) and a read only memory (ROM), a hard disk, a flash drive, etc.

The electronic controller 52 controls the electric actuator 28. The electronic controller 52 actuates the shifting device 22 in a state where the rotational angle CA of the crank 12A is in a predetermined range. The predetermined range includes the top dead center or the bottom dead center of the crank 12A. The shifting action includes a first shifting action and a second shifting action, which is performed after the first shifting action. The second shifting action includes all shifting actions that are performed after the first shifting action. In a case where the predetermined range includes the top dead center of the crank 12A, it is preferred that the predetermined range be selected in an angle range from +45 degrees from the top dead center to −45 degrees from the top dead center. It is further preferred that the predetermined range be selected in an angle range from +20 degrees from the top dead center to −20 degrees from the top dead center. In a case where the predetermined range includes the bottom dead center of the crank 12A, it is preferred that the predetermined range be selected in an angle range from +45 degrees from the bottom dead center to −45 degrees from the bottom dead center. It is further preferred that the predetermined range be selected in an angle range from +20 degrees from the bottom dead center to −20 degrees from the bottom dead center.

The electronic controller 52 controls the motor 24. The electronic controller 52 controls a motor output TM in accordance with the manual driving force TA. In a case where the shifting device 22 performs the shifting action, the electronic controller 52 reduces the motor output TM. In a case where the shifting device 22 performs the shifting action, the electronic controller 52 reduces the motor output TM to less than or equal to a limit value DTM. Based on the result of one or more shifting actions (first shifting actions), the electronic controller 52 determines whether or not to change control contents related to subsequent shifting actions (second shifting actions). The control contents that are changed include at least one of the limit value DTM of the motor output TM, which is used in the execution of the shifting action, and a first time SA, in which the motor output TM is decreased. The memory device 54 includes information related to the limit value DTM of the motor output TM, which is used in the execution of the shifting action, and information related to the first time SA. The memory device 54 further stores information related to a reference value TMA of the motor output TM. For example, at the time of shipment of the bicycle control device 50 and setting initialization, the memory device 54 stores the limit value DTM as the reference value TMA and a predetermined time as the first time SA. In a case where the electronic controller 52 performs the shifting action in this state, the electronic controller 52 controls the motor 24 so that the motor output TM is set to the reference value TMA during the predetermined time. The reference value TMA can be set in accordance with the manual driving force TA. For example, in a case where the manual driving force TA is less than driving force TA1, the reference value TMA is set to a first reference value TMA1. In a case where the manual driving force TA is greater than or equal to the driving force TA, the reference value TMA is set to a second reference value TMA2. The first reference value TMA1 is less than the second reference value TMA2.

The electronic controller 52 is configured to change at least one of the limit value DTM and the first time SA in accordance with at least one of the actuation state of the shifting device 22 in the shifting action and a parameter of the bicycle 10 that is changed by the shifting action performed by the shifting device 22. In accordance with at least one of the actuation state of the shifting device 22 in the first shifting action and a parameter of the bicycle 10 that is changed by the shifting action performed by the shifting device 22, the electronic controller 52 sets at least one of the limit value DTM and the first time SA that are used in a case where the second shifting action is performed to differ from at least one of the limit value DTM and the first time SA that are used in a case where the first shifting action is performed. The parameter of the bicycle 10 includes the rotational speed N of the crank. The electronic controller 52 determines whether or not the transmission ratio r is appropriately changed in accordance with the actuation state of the shifting device 22, which is detected based on an output of the shifting state detection device 40, and an estimated rotational speed NA of the crank, which is calculated based on the rotational speed N of the crank and the transmission ratio r (reference transmission ratio Tr) corresponding to each shift stage. The memory device 54 stores at least one piece of information related to the state of the shifting device 22 corresponding to each shift stage and information related to the transmission ratio r (reference transmission ratio Tr) corresponding to each shift stage. The electronic controller 52 is configured to determine that the shifting action is completed in a case where the actuation state of the shifting device 22, which is detected based on the output of the shifting state detection device 40, conforms to the actuation state of the shifting device 22 corresponding to the target shift stage. The electronic controller 52 is configured to determine that the shifting action is completed and that the transmission ratio r has been changed in a case where the rotational speed N of the crank conforms to an estimated rotational speed N of the crank calculated from the rotational speed N of the crank that is obtained in step S23 prior to the shifting and the transmission ratio r, which corresponds to the target shift stage. The electronic controller 52 is configured to change at least one of the limit value DTM and the first time SA based on the determination result of whether or not the transmission ratio r is appropriately changed.

If the shifting device 22 performs the first shifting action and the first shifting action is uncompleted or the transmission ratio r remains unchanged within a predetermined period SX, in a case where the shifting device 22 performs the second shifting action, then the electronic controller 52 performs at least one of decreasing the limit value DTM and increasing the first time SA from a case where the shifting device 22 performs the first shifting action. In one example, the predetermined period SX can be a period from time at which the first shifting action is started or time at which the limitation on the motor output TM is started to time at which the crank 12A is rotated to a predetermined angle. The predetermined angle is selected to be less than or equal to 180 degrees and, for example, less than or equal to 90 degrees. The predetermined angle is selected to be greater than or equal to 20 degrees and, preferably, greater than or equal to 30 degrees.

If the shifting device 22 performs the first shifting action and the first shifting action is uncompleted or the transmission ratio r remains unchanged within the predetermined period SX in a state where the motor output TM is not decreased to a predetermined value TMX, in a case where the shifting device 22 performs the second shifting action, then the electronic controller 52 decreases the limit value DTM from a case where the shifting device 22 performs the first shifting action. If the shifting device 22 performs the first shifting action and the first shifting action is uncompleted or the transmission ratio r remains unchanged within the predetermined period SX in a state where the motor output TM is decreased to the predetermined value TMX, in a case where the shifting device 22 performs the second shifting action, then the electronic controller 52 increases the first time SA from a case where the shifting device 22 performs the first shifting action. If the first shifting action is started and the first shifting action is uncompleted or the transmission ratio r remains unchanged within the predetermined period SX, then the electronic controller 52 decreases the limit value DTM in a stepped manner until the motor output TM is decreased to the predetermined value TMX. If the limit value DTM is decreased until the motor output TM is decreased to the predetermined value TMX, then the electronic controller 52 begins to increase the first time SA. The predetermined value TMX is selected to be, for example, zero.

If the shifting device 22 performs the first shifting action and the first shifting action is uncompleted or the number of times that the transmission ratio r remained unchanged reaches a first number of times within the predetermined period SX, in a case where the shifting device 22 performs the second shifting action, then the electronic controller 52 performs at least one of decreasing the limit value DTM and increasing the first time SA from a case where the shifting device 22 performs the first shifting action.

If the shifting device 22 performs the first shifting action and the first shifting action is completed or the transmission ratio r is changed within the predetermined period SX, in a case where the shifting device 22 performs the second shifting action, then the electronic controller 52 performs at least one of increasing the limit value DTM and decreasing the first time SA from a case where the shifting device 22 performs the first shifting action.

If the shifting device 22 performs the first shifting action and the first shifting action is completed or the transmission ratio r is changed within the predetermined period SX in a state where the first time SA is longer than a predetermined value SY, in a case where the shifting device 22 performs the second shifting action, then the electronic controller 52 decreases the first time SA from a case where the shifting device 22 performs the first shifting action. If the shifting device 22 performs the first shifting action and the first shifting action is completed or the transmission ratio r is changed within the predetermined period SX in a state where the first time SA is less than or equal to the predetermined value SY, in a case where the shifting device 22 performs the second shifting action, then the electronic controller 52 increases the limit value DTM from a case where the shifting device 22 performs the first shifting action. If the shifting device 22 performs the first shifting action and the first shifting action is completed or the transmission ratio r is changed within the predetermined period SX, in a case where the first time SA is longer than the predetermined value SY, then the electronic controller 52 decreases the first time SA in a stepped manner. If the first time SA reaches the predetermined value SY, then the electronic controller 52 begins to increase the limit value DTM of the motor output TM.

If the shifting device 22 performs the first shifting action and the first shifting action is completed or the number of times that the transmission ratio r is changed reaches a second number of times within the predetermined period SX, in a case where the shifting device 22 performs the second shifting action, then the electronic controller 52 performs at least one of increasing the limit value DTM and decreasing the first time SA from a case where the shifting device 22 performs the first shifting action.

Only in a case where the manual driving force TA that is input to the crank 12A is greater than or equal to a predetermine value TAX, the electronic controller 52 executes control in accordance with the determination based on the rotational speed N of the crank. In a case where only completion of the shifting action is determined by the output of the shifting state detection device 40, at least one of the motor output TM and the first time SA can be changed in a case where the second shifting is performed even if the manual driving force TA is less than the predetermine value TAX.

The electronic controller 52 receives an output signal from the operation portion 26 as a shift request. The electronic controller 52 controls the shifting device 22 and the motor 24 in accordance with the shift request. The memory device 54 stores information related to the target shift stage that is changed in accordance with the shift request. If the information related to the target shift stage is updated, the electronic controller 52 controls the shifting device 22 to obtain the shift stage corresponding to the updated information. More specifically, in a case where the electronic controller 52 receives an output signal including a shift up signal as the shift request, the electronic controller 52 executes a first process that changes the information related to the target shift stage stored in the memory device 54 to information corresponding to a shift stage at which the transmission ratio r is increased from the present transmission ratio r. In a case where the electronic controller 52 receives an output signal including a shift down signal as the shift request, the electronic controller 52 executes a first process that changes the information related to the target shift stage stored in the memory device 54 to information corresponding to a shift stage at which the transmission ratio r is decreased from the present transmission ratio r. The electronic controller 52 executes a second process that controls the shifting device 22 and the motor 24 in accordance with the information related to the target shift stage updated by the first process.

Figure 2:
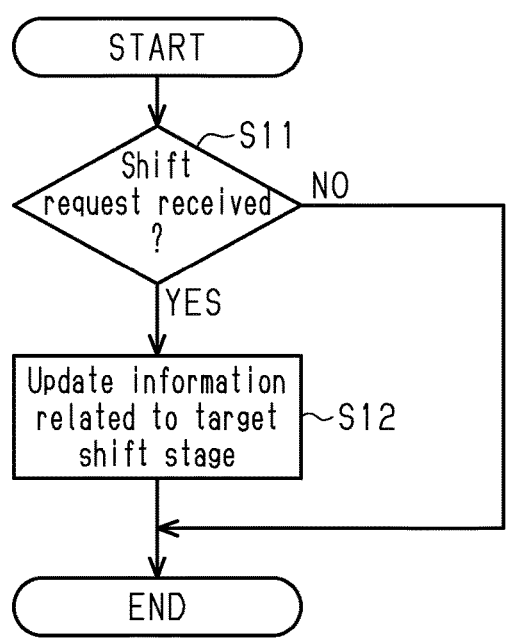
FIG. 2 is a first flowchart in accordance with a process executed by an electronic controller of the bicycle control device illustrated in FIG. 1.

The first process will now be described with reference to FIG. 2. The electronic controller 52 executes the first process in predetermined cycles while the bicycle control device 50 is activated.

In step S11, the electronic controller 52 determines whether or not the shift request is received. If the shift request is received, then the electronic controller 52 proceeds to step S12 and updates the information related to the target shift stage stored in the memory device 54. After the predetermined cycle, the electronic controller 52 again executes step S11. If the shift request is not received in step S11, then the electronic controller 52 again executes step S11 after the predetermined cycle.

Figure 3:
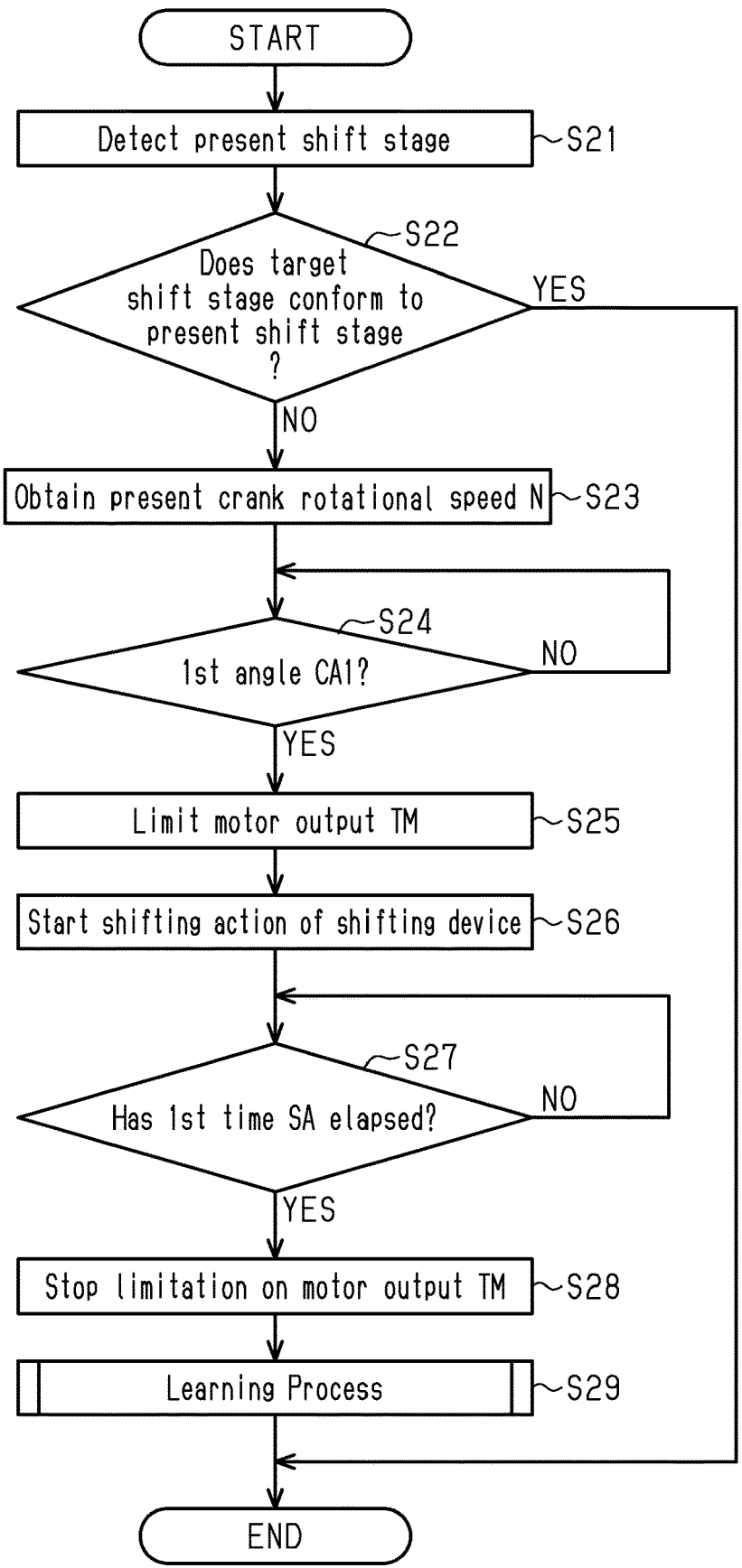
FIG. 3 is a second flowchart in accordance with a process executed by the electronic controller of FIG. 1.

The second process will now be described with reference to FIG. 3. The electronic controller 52 executes the second process in predetermined cycles while the bicycle control device 50 is activated.

The electronic controller 52 detects the present shift stage in step S21 and proceeds to step S22. The present shift stage can be detected by the shifting state detection device 40. Alternatively, the present shift stage can be detected from the transmission ratio r that is calculated based on the rotational speed N of the crank and the rotational speed V of the wheel. In step S22, the electronic controller 52 determines whether or not the target shift stage conforms to the present shift stage. More specifically, the electronic controller 52 compares the target shift stage, which is updated in the first process shown in FIG. 2, with a shift stage corresponding to the actuation state of the shifting device 22 detected by the shifting state detection device 40. If the target shift stage conforms to the present shift stage, then the electronic controller 52 ends the process. If the target shift stage differs from the present shift stage, then the electronic controller 52 to step S23.

The electronic controller 52 obtains the present rotational speed N of the crank in step S23 and proceeds to step S24. In step S24, the electronic controller 52 determines whether or not the rotational angle CA of the crank reaches a first angle CA1. The first angle CA1 corresponds to the upstream end of the predetermined range in a forward rotational direction of the crank 12A. The electronic controller 52 repeats the determination of step S24 until the first angle CA1 is reached. If the electronic controller 52 determines in step S24 that the first angle CA1 is reached, then the electronic controller 52 starts to limit the motor output TM in step S25 and proceeds to step S26. In step S25, the electronic controller 52 controls the motor 24 so that motor output TM becomes the limit value DTM stored in the memory device 54. In step S26, the electronic controller 52 starts the shifting action of the shifting device 22 so that the transmission ratio r is changed to the target shift stage stored in the memory device 54.

In step S27, the electronic controller 52 determines whether or not the first time SA has elapsed. More specifically, the electronic controller 52 determines in step S27 whether or not the time from which the limitation on the motor output TM is started is greater than or equal to the first time SA. The electronic controller 52 repeats the determination of step S27 until the first time SA elapses. If the electronic controller 52 determines that the first time SA has elapsed, then the electronic controller 52 stops the limitation on the motor output TM in step S28. In step S29, the electronic controller 52 executes a subroutine of a learning process related to the limit value DTM of the motor output TM and the first time SA and ends the present process.

Figure 4:
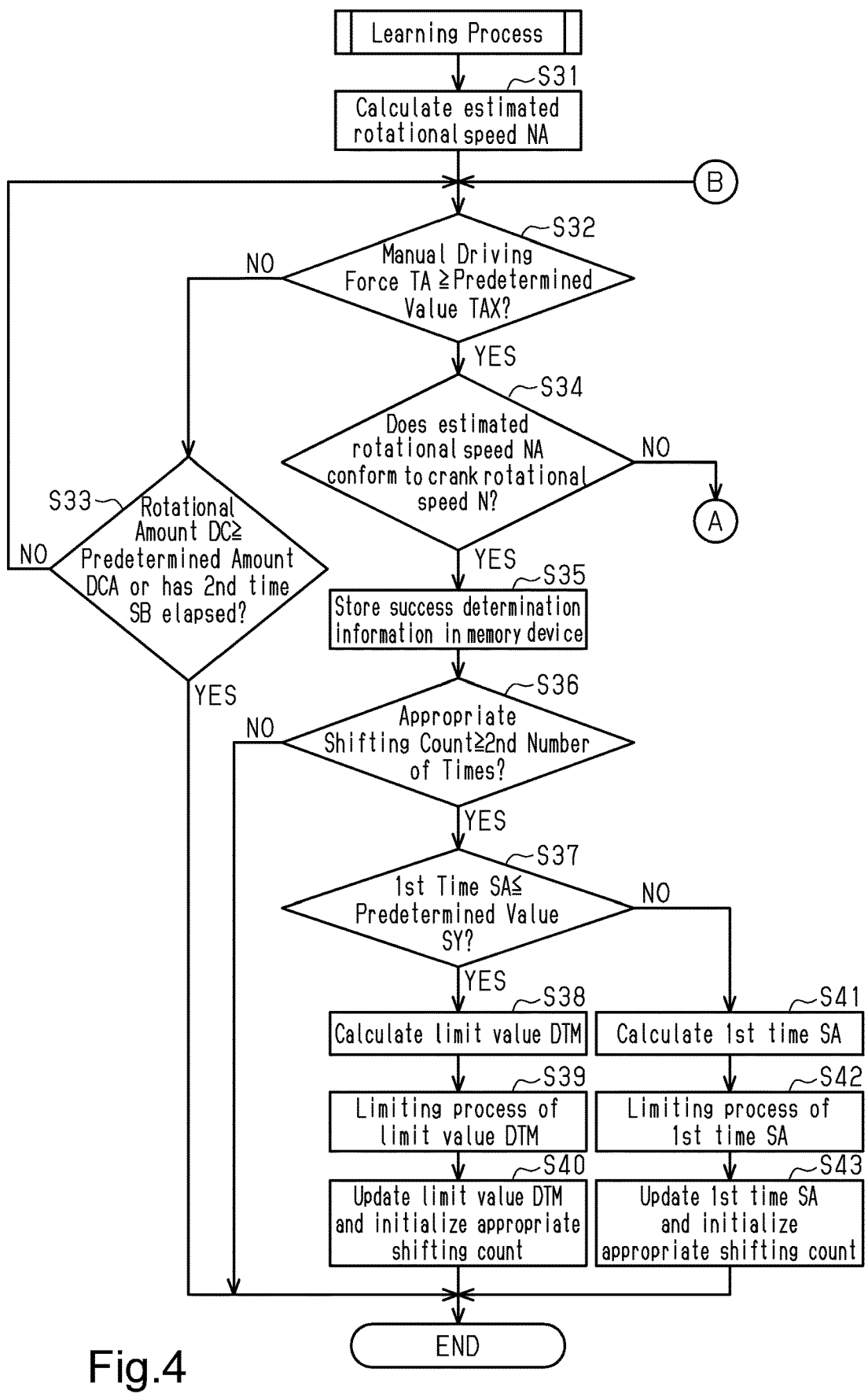
FIG. 4 is a third flowchart in accordance with a process executed by the electronic controller of FIG. 1.

The learning process will now be described with reference to FIGS. 4 and 5. As shown in FIG. 4, the electronic controller 52 calculates the estimated rotational speed NA of the crank 12A in step S31 and proceeds to step S32. The estimated rotational speed NA is calculated by multiplying the rotational speed N of the crank, which is obtained in step S23, by the transmission ratio r, which corresponds to the target shift stage updated in step S12. In step S32, the electronic controller 52 determines whether or not the manual driving force TA is greater than or equal to the predetermine value TAX.

In a case where the manual driving force TA is less than the predetermined value TAX, the electronic controller 52 determines in step S33 whether or not a rotational amount DC of the crank 12A is greater than or equal to a predetermined amount DCA and a time SB has elapsed. For example, if the time from which the limitation on the motor output TM is stopped in step S28 of FIG. 3 is greater than or equal to the second time SB, then the electronic controller 52 determines that the second time SB has elapsed. The second time SB corresponds to enough time for the rotational amount DC of the crank 12A to become greater than or equal to the predetermined amount DCA, for example, while the bicycle 10 is traveling at a predetermined speed. If the rotational amount DC of the crank 12A is less than the predetermined amount DCA, then the electronic controller 52 again executes the determination of step S32. If the rotational amount DC of the crank 12A is greater than or equal to the predetermined amount DCA, then the electronic controller 52 ends the present process. The rotational amount DC of the crank 12A is the amount of the rotational angle CA of the crank that is changed, for example, from the stopping of the limitation on the motor output TM in step S28 of FIG. 3. If the rider intentionally reduces the rotational speed N of the crank or stops pedaling, then the manual driving force TA tends to be less than the predetermined value TAX. If the manual driving force TA is less than the predetermined value TAX and the rotational amount DC of the crank 12A is greater than or equal to the predetermined amount DCA, then the manual driving force TA is not sufficiently increased even though the crank 12A is sufficiently rotated after the execution of the shifting action. This leads to incorrect determination of whether or not the shifting is appropriately performed. Thus, the process is ended. Additionally, if the second time SB has elapsed in a state where the manual driving force TA is less than the predetermined value TAX and the rotational amount DC of the crank 12A is less than the predetermined amount DCA, the determination of whether or not the shifting is appropriately performed cannot be correctly made. Thus, the process is ended. If the rider intentionally decreases the rotational speed N of the crank, the rotational speed V of the wheel tends to be greater than or equal to a value obtained by multiplying the rotational speed N of the crank 12A by the transmission ratio r. This hinders the determination of whether or not the shifting is appropriately performed.

If the electronic controller 52 determines in step S32 that the manual driving force TA is greater than or equal to the predetermine value TAX, then the electronic controller 52 proceeds to in step S34 to compare the estimated rotational speed NA, which is calculated in step S31, and the rotational speed N of the crank. If the estimated rotational speed NA conforms to the rotational speed N of the crank, then it can be determined that the shifting is appropriately performed. Thus, the electronic controller 52 proceeds to step S35. The electronic controller 52 can be configured to determine in step S34 that the shifting is appropriately performed and proceed to step S35 if the state of the shifting device 22, which is detected by the shifting state detection device 40, corresponds to the target shift stage. The electronic controller 52 stores success determination information, which indicates that the shifting is appropriately performed, in the memory device 54 in step S35 and proceeds to step S36.

In step S36, the electronic controller 52 determines whether or not the number of times that the shifting is appropriately performed is greater than or equal to the second number of times from the success determination information stored in the memory device 54. In the present embodiment, the number of times that the shifting is appropriately performed is referred to as the appropriate shifting count. If the appropriate shifting count is less than the second number of times, the electronic controller 52 ends the process. If the appropriate shifting count is greater than or equal to the second number of times, the electronic controller 52 proceeds to step S37 and determines whether or not the first time SA is less than or equal to the predetermined value SY. If the first time SA is less than or equal to the predetermined value SY, then the electronic controller 52 proceeds to step S38.

In step S38, the electronic controller 52 calculates the limit value DTM of the motor output TM. More specifically, the electronic controller 52 adds a predetermined value to the present limit value DTM. In step S39, the electronic controller 52 performs a limiting process on the limit value DTM. More specifically, if the limit value DTM that is calculated in step S38 is greater than or equal to a predetermined value DTX1, then the electronic controller 52 limits the limit value DTM to the predetermined value DTX1. The limitation of the limit value DTM to the predetermined value DTX1 or less reduces situations in which the shifting is performed in a state where the motor output TM is high. In step S40, the electronic controller 52 updates the limit value DTM that is calculated in step S38 or updates the predetermined value DTX1 to a new limit value DTM in a case where the limiting process is executed in step S39. Additionally, the electronic controller 52 initializes the appropriate shifting count and the ends the process.

If the electronic controller 52 determines in step S37 that the first time SA is greater than the predetermined value SY, then the electronic controller 52 proceeds to step S41 and calculates the first time SA. More specifically, the electronic controller 52 subtracts a predetermined value from the present first time SA. In step S42, the electronic controller 52 performs the limiting process on the first time SA. More specifically, if the first time SA that is calculated in step S41 is less than or equal to the predetermined value SY, then the electronic controller 52 limits the first time SA to the predetermined value SY. In step S43, the electronic controller 52 updates the first time SA that is calculated in step S41 or updates the predetermined value SY to a new first time SA in a case where the limiting process is performed in step S42. Additionally, the electronic controller 52 initializes information related to the appropriate shifting count and ends the process.

Figure 5:
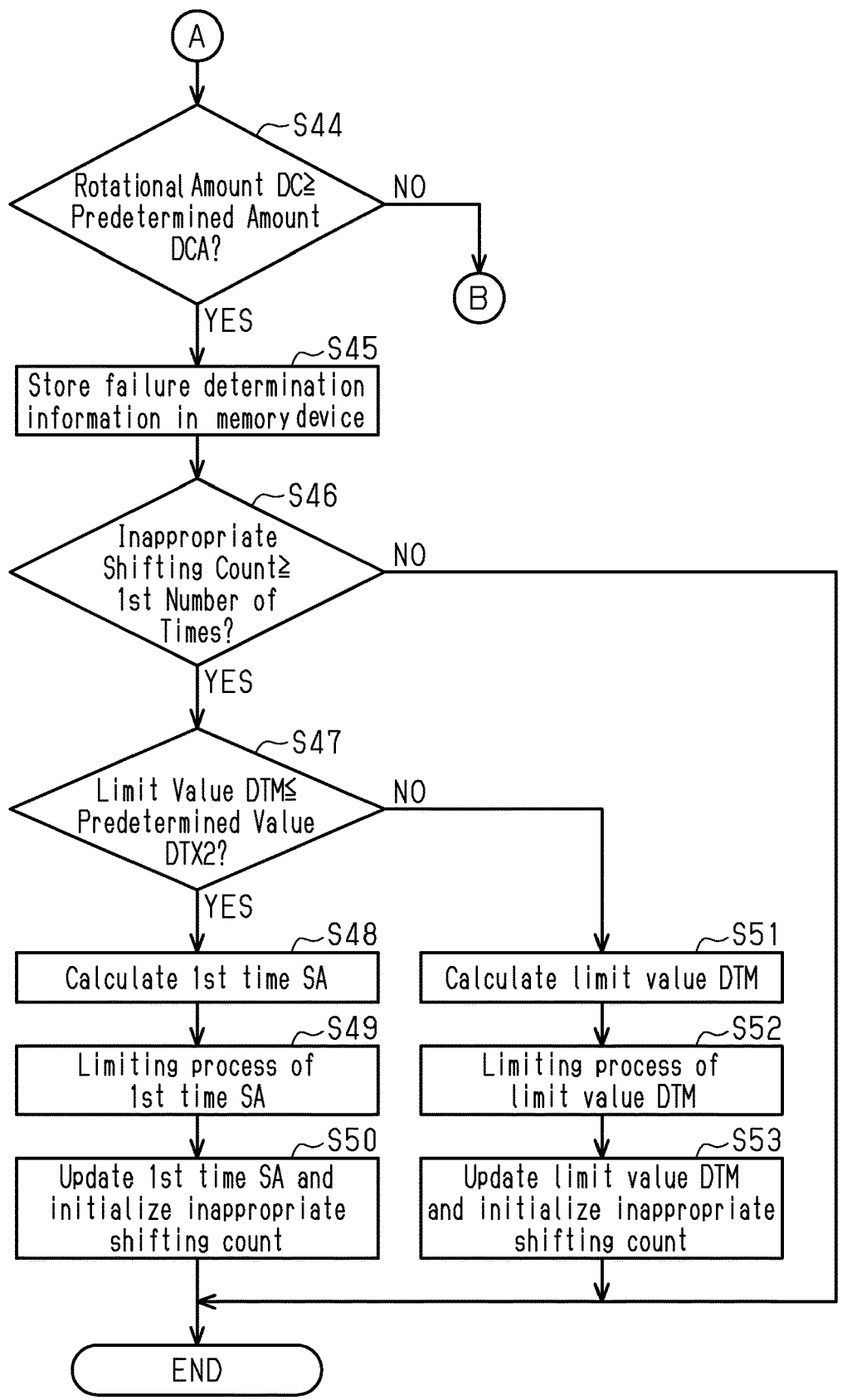
FIG. 5 is a fourth flowchart in accordance with a process executed by the electronic controller of FIG. 1.

If the estimated rotational speed NA does not conform to the rotational speed N of the crank in step S34, then the electronic controller 52 proceeds to step S44 of FIG. 5 and determines in step S44 whether or not the rotational amount DC of the crank 12A is greater than or equal to the predetermined amount DCA. If the rotational amount DC of the crank 12A is less than the predetermined amount DCA, then the electronic controller 52 again executes the determination process of step S32 of FIG. 4. If the rotational amount DC of the crank 12A is greater than or equal to the predetermined amount DCA, then the electronic controller 52 proceeds to step S45.

If the estimated rotational speed NA does not conform to the rotational speed N of the crank in step S34 and the electronic controller 52 determines in step S44 that the rotational amount DC of the crank 12A is greater than or equal to the predetermined amount DCA, then the electronic controller 52 can determine that the shifting is not appropriately performed and proceed to step S45. The electronic controller 52 can be configured to determine in step S34 that the shifting is not appropriately performed and proceed to step S45 if the state of the shifting device 22, which is detected by the shifting state detection device 40, does not correspond to the target shift stage. The electronic controller 52 stores failure determination information, which indicates that the shifting is not appropriately performed, in the memory device 54 in step S45 and proceeds to step S46.

In step S46, the electronic controller 52 determines whether or not the number of times that the shifting is not appropriately performed is greater than or equal to the first number of times from the failure determination information stored in the memory device 54. In the present embodiment, the number of times that the shifting is not appropriately performed is referred to as the inappropriate shifting count. If the inappropriate shifting count is less than the first number of times, then the electronic controller 52 ends the process. If the inappropriate shifting count is greater than or equal to the first number of times, then the electronic controller 52 proceeds to step S47 and determines whether or not the limit value DTM is less than or equal to a predetermined value DTX2. If the limit value DTM is less than or equal to the predetermined value DTX2, then the electronic controller 52 proceeds to step S48. The predetermined value DTX2 is selected to be, for example, zero.

In step S48, the electronic controller 52 calculates the first time SA. More specifically, the electronic controller 52 adds a predetermined value to the present first time SA. In step S49, the electronic controller 52 performs the limiting process on the first time SA. More specifically, if the first time SA that is calculated in step S48 is greater than or equal to an upper limit value SC, then the electronic controller 52 limits the first time SA to the upper limit value SC. In step S50, the electronic controller 52 updates the first time SA that is calculated in step S48 or updates the upper limit value SC to a new first time SA in a case where the limiting process is performed in step S49. Additionally, the electronic controller 52 initializes information related to the inappropriate shifting count and ends the process.

If the electronic controller 52 determines in step S47 that the limit value DTM is greater than the predetermined value DTX2, then the electronic controller 52 proceeds to step S51 and calculates the limit value DTM of the motor output TM. More specifically, the electronic controller 52 subtracts a predetermined value from the present limit value DTM. In step S52, the electronic controller 52 performs the limiting process on the limit value DTM. More specifically, if the limit value DTM that is calculated in step S51 is less than or equal to the predetermined value DTX2, the electronic controller 52 limits the limit value DTM to the predetermined value DTX2. In a case where the limit value DTM is set to zero, the motor output TM is zero during the first time SA. In step S53, the electronic controller 52 updates the limit value DTM that is calculated in step S51 or updates the predetermined value DTX2 as a new limit value DTM in a case where the limiting process is performed in step S53. Additionally, the electronic controller 52 initializes information related to the inappropriate shifting count and ends the process.

Second Embodiment

Figure 6:
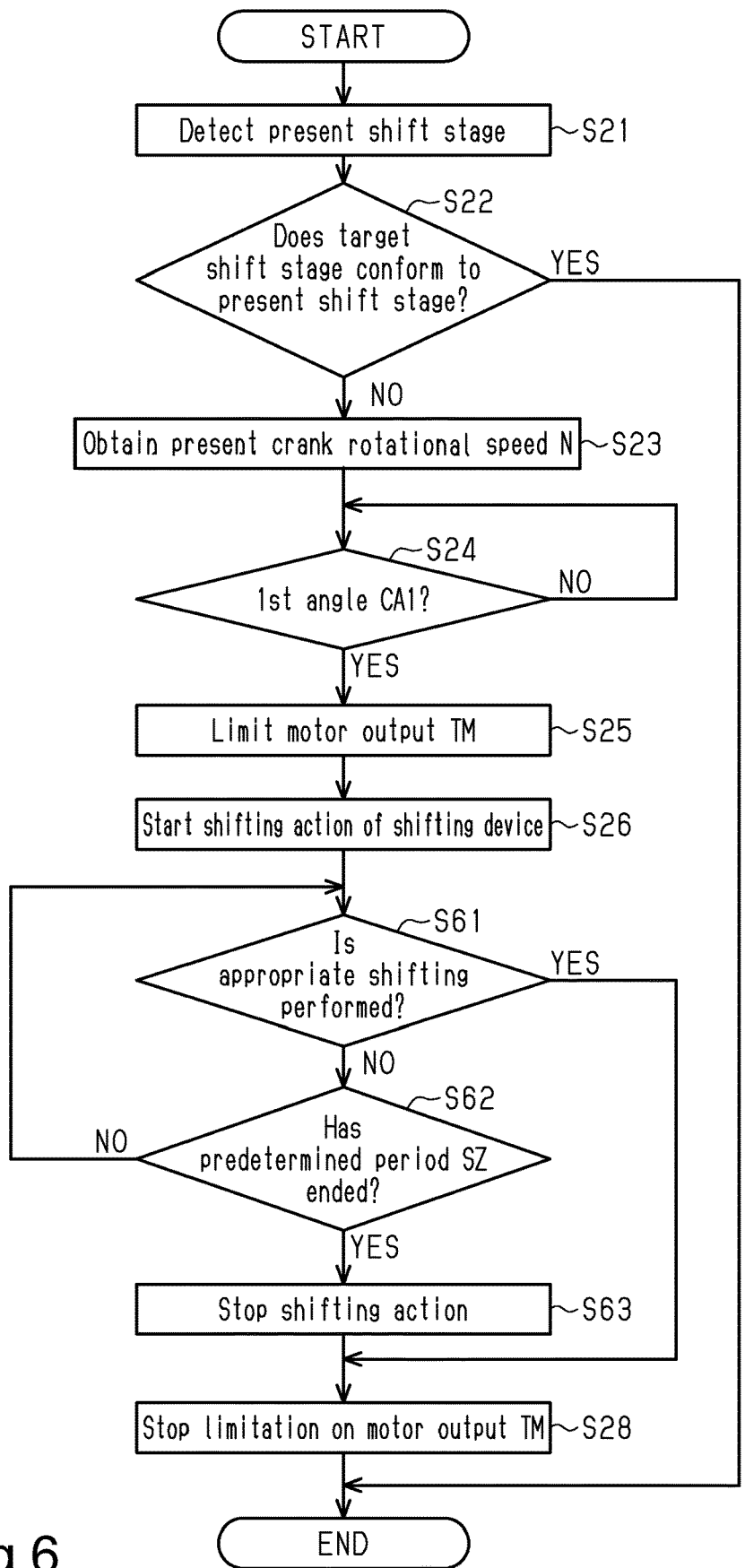
FIG. 6 is a fifth flowchart in accordance with a process executed by an electronic controller of a bicycle control device in accordance with a second embodiment.

A second embodiment of a bicycle control device 50 will now be described with reference to FIGS. 1 and 6. In the second embodiment, the same reference characters are given to those components that are the same as the corresponding components of the first embodiment. The second embodiment differs from the first embodiment only in the content of the second process and has the same first process and the same structure as the first embodiment. The same part will not be described. Only the differences will be described.

In a case where the shifting device 22 performs a shifting action, the electronic controller 52 decreases the output of the motor 24. If the shifting action is completed or the transmission ratio r is changed before a predetermined period SZ elapses, then the electronic controller 52 terminates the control for decreasing the output of the motor 24 before the predetermined period SZ elapses. If the shifting action or the change in the transmission ratio r is uncompleted even though the predetermined period SZ has elapsed, then the electronic controller 52 terminates the control for decreasing the output of the motor 24. The predetermined period SZ is set for every one of the transmission ratio that is to be changed. The predetermined period SZ is stored in the memory device 54. The predetermined period SZ can be measured using a timer. Alternatively, the predetermined period SZ can be measured based on the rotational angle CA of the crank.

The second process will now be described with reference to FIG. 6. The electronic controller 52 executes the second process in predetermined cycles while the bicycle control device 50 is activated. The electronic controller 52 detects the present shift stage in step S21 and proceeds to step S22. In step S22, the electronic controller 52 determines whether or not the target shift stage conforms to the present shift stage. If the target shift stage conforms to the present shift stage, then the electronic controller 52 ends the process. If the target shift stage differs from the present shift stage, the electronic controller 52 proceeds to step S23.

The electronic controller 52 obtains the present rotational speed N of the crank in step S23 and proceeds to step S24. In step S24, the electronic controller 52 determines whether or not the rotational angle CA of the crank reaches the first angle CA1. The electronic controller 52 repeats the determination of step S24 until the first angle CA1 is reached. If the electronic controller 52 determines in step S24 that the first angle CA1 is reached, the electronic controller 52 starts to limit the motor output TM in step S25 and proceeds to step S26. In step S26, the electronic controller 52 controls the motor 24 so that the motor output TM becomes the limit value DTM stored in the memory device 54. In step S26, the electronic controller 52 starts the shifting action of the shifting device 22 so that the transmission ratio r is changed to the target shift stage that is set in step S12.

The electronic controller 52 proceeds to step S61 and determines whether or not the appropriate shifting is performed. The electronic controller 52 can determine that the appropriate shifting is performed if the actuation state of the shifting device 22, which is detected based on the output of the shifting state detection device 40, conforms to the actuation state of the shifting device 22 corresponding to the target shift stage. The electronic controller 52 can determine that the appropriate shifting is performed if the rotational speed N of the crank conforms to the estimated rotational speed N of the crank, which is calculated from the rotational speed N of the crank that is obtained in step S23 prior to the shifting and the transmission ratio r, which corresponds to the target shift stage. If the electronic controller 52 determines that the appropriate shifting is not performed, then the electronic controller 52 proceeds to step S62 and determines whether or not the predetermined period SZ has elapsed. The electronic controller 52 determines that the predetermined period SZ has elapsed, for example, if the time elapsed from time at which the shifting device 22 starts the shifting action in step S26 is greater than or equal to the predetermined period SZ. If the predetermined period SZ has not elapsed, then the electronic controller 52 again executes the determination of step S61. If the electronic controller 52 determines in step S62 that the predetermined period SZ has elapsed, then the electronic controller 52 stops the shifting action in step S63 and the limitation on the motor output TM in step S28. In this case, if the predetermined period SZ elapses in a state where the shifting is uncompleted, the shifting action is interrupted. The predetermined period SZ can be a period from time at which the first shifting action is started or the limitation on the motor output TM is started to time at which the crank 12A is rotated to a predetermined angle. The predetermined angle is selected to be less than or equal to 180 degrees and is, for example, less than or equal to 90 degrees. The predetermined angle is selected to be greater than or equal to 20 degrees and, preferably, greater than or equal to 30 degrees.

If the electronic controller 52 determines in step S61 that the appropriate shifting is performed, then the limitation on the motor output TM is stopped in step S28. In this case, the limitation of the motor output TM is stopped before the predetermined period SZ.

MODIFICATIONS

The above description illustrates embodiments of a bicycle control device according to the present invention and is not intended to be restrictive. The embodiments of the bicycle control device according to the present invention can be modified, for example, as follows. Further, two or more of the modifications can be combined. In the following modifications, the same reference characters are given to those components that are the same as the corresponding components of the embodiments. Such components will not be described.

In a first modification of the bicycle control device 50, each step shown in steps S44 to S53 can be omitted from the learning process of the first embodiment that is shown in FIGS. 4 and 5. In this case, if the negative determination is made in step S34, the electronic controller 52 ends the process.

In a second modification of the bicycle control device 50, each step shown in steps S35 to S43 can be omitted from the learning process of the first embodiment that is shown in FIGS. 4 and 5. In this case, if the affirmative determination is made in step S34, the electronic controller 52 ends the process.

In a third modification of the bicycle control device 50, in steps S34 and S61 of each of the embodiments and modifications, if the transmission ratio r, which corresponds to the target shift stage stored in the memory device 54, conforms to the ratio of the rotational speed V of the wheel to the present rotational speed N of the crank, then the electronic controller 52 can determine that the shifting is appropriately performed and proceed to the next step. The electronic controller 52 can change at least one of the limit value DTM and the first time SA based on the determination result of whether or not the transmission ratio r is appropriately changed. In this case, step S31 can be omitted from the first embodiment and each modification that includes step S31.

In a fourth modification of the bicycle control device 50, in each of the embodiments and modifications, the information related to the target shift stage can be replaced by information related to the target transmission ratio r. The electronic controller 52 detects the present transmission ratio r in step S21 and proceeds to step S22. The present transmission ratio r is calculated based on the rotational speed N of the crank and the rotational speed V of the wheel. In step S22, the electronic controller 52 determines whether or not the target transmission ratio r conforms to the present transmission ratio r. More specifically, the electronic controller 52 compares information related to the transmission ratio r corresponding to the target shift stage updated in the first process shown in FIG. 2 with the transmission ratio r calculated by the ratio of the rotational speed V of the wheel to the rotational speed N of the crank. If the target transmission ratio r conforms to the present transmission ratio r in step S22, then the electronic controller 52 ends the process. If the target transmission ratio r differs from the present transmission ratio r in step S22, then the electronic controller 52 proceeds to step S23. In step S26, the electronic controller 52 starts the shifting action of the shifting device 22 so that the transmission ratio r is changed to the target transmission ratio r that is set in step S21.

In a fifth modification of the bicycle control device 50, in a case where the transmission ratio r is decreased in the first shifting action of the first embodiment and the first to fourth modifications, the second shifting action can include all shifting actions that decrease the transmission ratio r and are performed after the first shifting action. Also, in a case where the transmission ratio r is increased in the first shifting action, the second shifting action can include all shifting actions that increase the transmission ratio r and are performed after the first shifting action. In this case, the memory device 54 stores the number of times that the shifting is appropriately performed to increase the transmission ratio r, the number of times that the shifting is not appropriately performed to increase the transmission ratio r, the first time SA for increasing the transmission ratio r, and the limit value DTM for increasing the transmission ratio r separately from the number of times that the shifting is appropriately performed to decrease the transmission ratio r, the number of times that the shifting is not appropriately performed to decrease the transmission ratio r, the first time SA for decreasing the transmission ratio r, and the limit value DTM for decreasing the transmission ratio r.

In a sixth modification of the bicycle control device 50, in a case where the shifting device 22 changes the transmission ratio r from a first transmission ratio r1 to a second transmission ratio r2 in the first shifting action of the first embodiment and the first to fourth modifications, the second shifting action includes all shifting actions in which the shifting device 22 changes the transmission ratio r from the first transmission ratio r1 to the second transmission ratio r2 that are performed after the first shifting action. In this case, the memory device 54 separately stores the number of times that the shifting is appropriately performed to change the transmission ratio r, the number of times that the shifting is not performed to change the transmission ratio r, the first time SA, and the limit value DTM for each combination of the transmission ratio r before a change and the transmission ratio r after the change.

In a seventh modification of the bicycle control device 50, steps S35 and S36 can be omitted from the learning process of the first embodiment and the learning processes of the modifications excluding the second modification. In this case, if the affirmative determination is made in step S34 of FIG. 4, then the electronic controller 52 proceeds to step S37. In this case, it is determined that the shifting is appropriately performed one time. Thus, at least one of the limit value DTM and the first time SA is changed for the subsequent shifting actions.

Steps S45 and S46 can be omitted from the learning process of the first embodiment and the learning processes of the modifications excluding the first modification. In this case, if the affirmative determination is made in step S46 of FIG. 5, then the electronic controller 52 proceeds to step S47. In this case, the shifting is not appropriately performed one time. Thus, at least one of the limit value DTM and the first time SA is changed for the subsequent shifting actions.

Steps S37 and S41 to S43 of FIG. 4 can be omitted from the learning process of the first embodiment and the learning processes of the modifications excluding the second modification so that the first time SA is configured not to be changed. In this case, if the affirmative determination is made in step S36, the electronic controller 52 proceeds to step S38. Alternatively, steps S37 to S40 can be omitted from the learning process of the first embodiment and the learning processes of the modifications excluding the second modification so that the limit value DTM is configured not to be changed. In this case, if the affirmative determination is made in step S36, the electronic controller 52 proceeds to step S41.

Steps S47 and S51 to S53 of FIG. 5 can be omitted from the learning process of the first embodiment and the learning processes of the modifications excluding the first modification so that the limit value DTM is configured not to be changed. In this case, if the affirmative determination is made in step S46, then the electronic controller 52 proceeds to step S48. Alternatively, steps S47 to S50 can be omitted from the learning process of the first embodiment and the learning processes of the modifications excluding the first modification so that the first time SA is configured not to be changed. In this case, if the affirmative determination is made in step S46, then the electronic controller 52 proceeds to step S51.

In the learning process of the first embodiment and the learning process of each modification including steps S38 to S40 and S41 to S43, if the shifting is appropriately performed, then the limit value DTM and the first time SA can both be changed. If the affirmative determination is made in step S36 of FIG. 4 or the affirmative determination is made in step S34 of the modifications that do not include steps S35 and S36, then the electronic controller 52 omits the determination process of step S37 and executes steps S38 to S40 and S41 to S43.

In the learning process of the first embodiment and the learning process of each modification including steps S48 to S50 and S51 to S53, if the shifting is not appropriately performed, then the limit value DTM and the first time SA can both be changed. If the affirmative determination is made in step S46 of FIG. 5 or the affirmative determination is made in step S44 of a modification that does not include steps S45 and S46, then the electronic controller 52 omits the determination process of step S47 and executes steps S48 to S50 and steps S51 to S53.

In the second process of each embodiment, the shifting action of the shifting device 22 can be started before the limitation on the motor output TM is started. Alternatively, the limitation on the motor output TM and the shifting action of the shifting device 22 can be simultaneously started.

Step S24 can be omitted from the second process of each embodiment. In this case, if the electronic controller 52 determines in step S22 that the target shift stage does not conform to the present shift stage, then the limitation on the motor output TM and the shifting action of the shifting device 22 can be immediately started.

The second process can be executed in an automatic shifting in which the electronic controller 52 automatically controls the shifting device 22 to perform shifting in accordance with one or more sensors mounted on the bicycle 10. The one or more sensors mounted on the bicycle 10 include at least one of a torque sensor, a vehicle speed sensor, and a cadence sensor. The electronic controller 52 determines whether or not a shift request is received based on signals from the one or more sensors mounted on the bicycle 10 and an automatic shifting control program stored in the memory device 54.

The shifting device 22 can be changed to a shifting device that manually performs a shifting action. In this case, the operation portion 26 and the shifting device 22 are connected by a cable. The electronic controller 52 sets a shift request and controls the motor 24 in accordance with an output of a detection portion that detects operation of the operation portion 26.

What is claimed is:

1. A bicycle control device comprising:
   an electronic controller configured to control a motor that assists propulsion of a bicycle,
   the electronic controller being further configured to execute a motor output decreasing control to decrease output of the motor upon determining a shifting device performs a shifting action to change a transmission ratio of the bicycle,
   the electronic controller being further configured to end the motor output decreasing control before a predetermined period elapses upon determining that the shifting action is completed before the predetermined period has elapsed,
   the electronic controller being further configured to end the motor output decreasing control upon determining that the predetermined time period has elapsed in a case where the shifting action or the change in the transmission ratio is uncompleted even though the predetermined period has elapsed,
   the electronic controller being further configured to execute a determination as to whether the shifting action was successful based on a rotational speed of a crank of the bicycle, the electronic controller executing the determination as to whether the shifting action was successful only upon determining that a manual driving force inputted to the crank is greater than or equal to a predetermined value, the electronic controller being further configured to update the predetermined period in accordance with the change in the transmission ratio that is to be executed by the shifting action and based on a result of the determination as to whether the shifting action was successful.

2. The bicycle control device according to claim 1, wherein the electronic controller is further configured to determine whether or not the shifting action is completed based on the rotational speed of the crank of the bicycle and a rotational speed of a wheel of the bicycle.

3. The bicycle control device according to claim 1, wherein the electronic controller is further configured to control an electric actuator that actuates the shifting device so that the shifting device performs the shifting action.

4. The bicycle control device according to claim 3, wherein the electronic controller is further configured to actuate the shifting device in a case where a rotational angle of a crank of the bicycle is in a predetermined range, the predetermined range including a top dead center of the crank or a bottom dead center of the crank.

5. A method for controlling a bicycle to control a motor that assists propulsion of the bicycle, the method comprising:

executing a motor output decreasing control to decrease an output of the motor upon determining that a shifting device performs a shifting action to change a transmission ratio of the bicycle;

ending the motor output decreasing control before a predetermined period ends upon determining the shifting action is completed before the predetermined period elapses;

ending the motor output decreasing control upon determining that the predetermined period has elapsed before the shifting action is completed;

executing a determination as to whether the shifting action was successful based on a rotational speed of a crank of the bicycle, the electronic controller executing the determination only upon determining that a manual driving force inputted to the crank is greater than or equal to a predetermined value; and updating the predetermined period in accordance with the change in the transmission ratio that is to be executed by the shifting action and based on a result of the determination as to whether the shifting action was successful.

6. The method according to claim 5, wherein the determining whether or not the shifting action is completed is based on the rotational speed of the crank of the bicycle and a rotational speed of a wheel of the bicycle.

7. The method according to claim 5, further comprising using an electric actuator to actuate the shifting device so that the shilling device performs the shifting action.

8. The method according to claim 7, wherein the using an electric actuator to actuate the shifting device is performed upon determining that a rotational angle of a crank of the bicycle is in a predetermined range, the predetermined range including a top dead center of the crank or a bottom dead center of the crank.

* * * * *